United States Patent
Liou et al.

(10) Patent No.: US 12,353,076 B2
(45) Date of Patent: Jul. 8, 2025

(54) ELECTRONIC DEVICE

(71) Applicant: InnoLux Corporation, Miao-Li County (TW)

(72) Inventors: Hao-Yu Liou, Miao-Li County (TW); Chih-Yung Hsieh, Miao-Li County (TW); Toshihiko Araki, Miao-Li County (TW); Chung-Kuang Wei, Miao-Li County (TW); Li-Wei Sung, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/666,780

(22) Filed: May 16, 2024

(65) Prior Publication Data
US 2024/0302685 A1    Sep. 12, 2024

Related U.S. Application Data

(63) Continuation of application No. 18/139,965, filed on Apr. 27, 2023, now Pat. No. 12,019,320, which is a (Continued)

(30) Foreign Application Priority Data

May 20, 2019  (CN) .......................... 201910419709.8

(51) Int. Cl.
G02F 1/13        (2006.01)
G02F 1/13357     (2006.01)
(Continued)

(52) U.S. Cl.
CPC ...... *G02F 1/1323* (2013.01); *G02F 1/133603* (2013.01); *G02F 1/133606* (2013.01); *G02F 1/167* (2013.01); *G02F 1/1677* (2019.01)

(58) Field of Classification Search
CPC ............ G02F 1/1335; G02F 1/133607; G02F 1/133603; G02F 1/1336; G02F 1/133606;
(Continued)

(56) References Cited

U.S. PATENT DOCUMENTS 6,198,462 B1 *    3/2001  Daily .................... H04N 13/38
                                                     348/E13.052
2007/0030675 A1 *  2/2007  Oon ....................... G03B 15/05
                                                     257/E33.071
(Continued)

*Primary Examiner* — Jonathan Y Jung
(74) *Attorney, Agent, or Firm* — Winston Hsu

(57) ABSTRACT

An electronic device includes a light source, at least three switching components and a light adjusting layer. The at least three switching components are disposed on the light source. The light adjusting layer is overlapped with the at least three switching components, wherein the light adjusting layer includes at least one light adjusting structure, and one light adjusting structure is corresponding to the at least three switching components and configured to adjust a light progressing direction of a light generated by the light source. The electronic device provides a first viewing-angle in a first state, the electronic device provides a second viewing-angle in a second state, and the first viewing-angle is different from the second viewing-angle.

9 Claims, 11 Drawing Sheets

Related U.S. Application Data continuation of application No. 17/891,126, filed on Aug. 18, 2022, now Pat. No. 11,675,223, which is a continuation of application No. 17/491,539, filed on Oct. 1, 2021, now Pat. No. 11,448,909, which is a continuation of application No. 16/866,556, filed on May 5, 2020, now Pat. No. 11,163,183.

(51) Int. Cl.
*G02F 1/167* (2019.01)
*G02F 1/1677* (2019.01)

(58) Field of Classification Search
CPC .. G02F 1/1677; G02F 1/1323; G02F 1/13471; G02F 1/167; G02F 2201/44
See application file for complete search history.

(56) References Cited

U.S. PATENT DOCUMENTS

| | | | |
|---|---|---|---|
| 2009/0115713 A1* | 5/2009 | Kakinuma | G09G 3/3426 345/88 |
| 2012/0050651 A1* | 3/2012 | Huang | G02F 1/133615 349/95 |
| 2015/0092139 A1* | 4/2015 | Eguchi | G03B 21/208 349/95 |
| 2015/0333102 A1* | 11/2015 | Sato | H10K 59/121 257/13 |
| 2016/0245961 A1* | 8/2016 | Akasaka | G02B 3/0056 |
| 2018/0210243 A1* | 7/2018 | Fang | G02F 1/137 |
| 2019/0080138 A1* | 3/2019 | Gao | G02B 3/0031 |
| 2019/0148466 A1* | 5/2019 | Guo | G09G 3/36 345/694 |
| 2019/0278135 A1* | 9/2019 | Woodgate | G02B 19/0028 |
| 2019/0355295 A1* | 11/2019 | Wang | G09G 3/3208 |
| 2020/0075879 A1* | 3/2020 | Luo | H10K 59/878 |
| 2020/0185368 A1* | 6/2020 | Park, II | H01L 33/0093 |
| 2020/0251689 A1* | 8/2020 | Pan | H10K 59/38 |
| 2020/0285113 A1* | 9/2020 | Shimizu | F21V 5/007 |

* cited by examiner

ELECTRONIC DEVICE

CROSS REFERENCE TO RELATED APPLICATIONS

This application is a continuation application of U.S. application Ser. No. 18/139,965, filed on Apr. 27, 2023, which is a continuation application of U.S. application Ser. No. 17/891,126, filed on Aug. 18, 2022, which is a continuation application of U.S. application Ser. No. 17/491,539, filed on Oct. 1, 2021, which is a continuation application of U.S. application Ser. No. 16/866,556, filed on May 5, 2020. The contents of these applications are incorporated herein by reference.

BACKGROUND OF THE DISCLOSURE

1. Field of the Disclosure

The present disclosure relates to a light emitting device (an electronic device), and more particularly to a light emitting device (an electronic device) capable of controlling its viewing-angle.

2. Description of the Prior Art

As the evolution and development of electronic devices, the electronic devices have become an indispensable item. For example, a display device, which is a kind of the electronic devices, has the characteristics of thin appearance, light weight, low power consumption and low radiation pollution, and it has been used in devices such as televisions, monitors, notebooks, smart phones, watches, and display devices in vehicles, so as to transmit and display information more conveniently. However, as the users attach importance to privacy when viewing the display device, the privacy screen function of the display device needs to be improved.

SUMMARY OF THE DISCLOSURE

According to an embodiment, the present disclosure provides an electronic device including a light source, at least three switching components and a light adjusting layer. The at least three switching components are disposed on the light source. The light adjusting layer is overlapped with the at least three switching components, wherein the light adjusting layer includes at least one light adjusting structure, and one light adjusting structure is corresponding to the at least three switching components and configured to adjust a light progressing direction of a light generated by the light source. The electronic device provides a first viewing-angle in a first state, the electronic device provides a second viewing-angle in a second state, and the first viewing-angle is different from the second viewing-angle.

DETAILED DESCRIPTION

Figure 1:
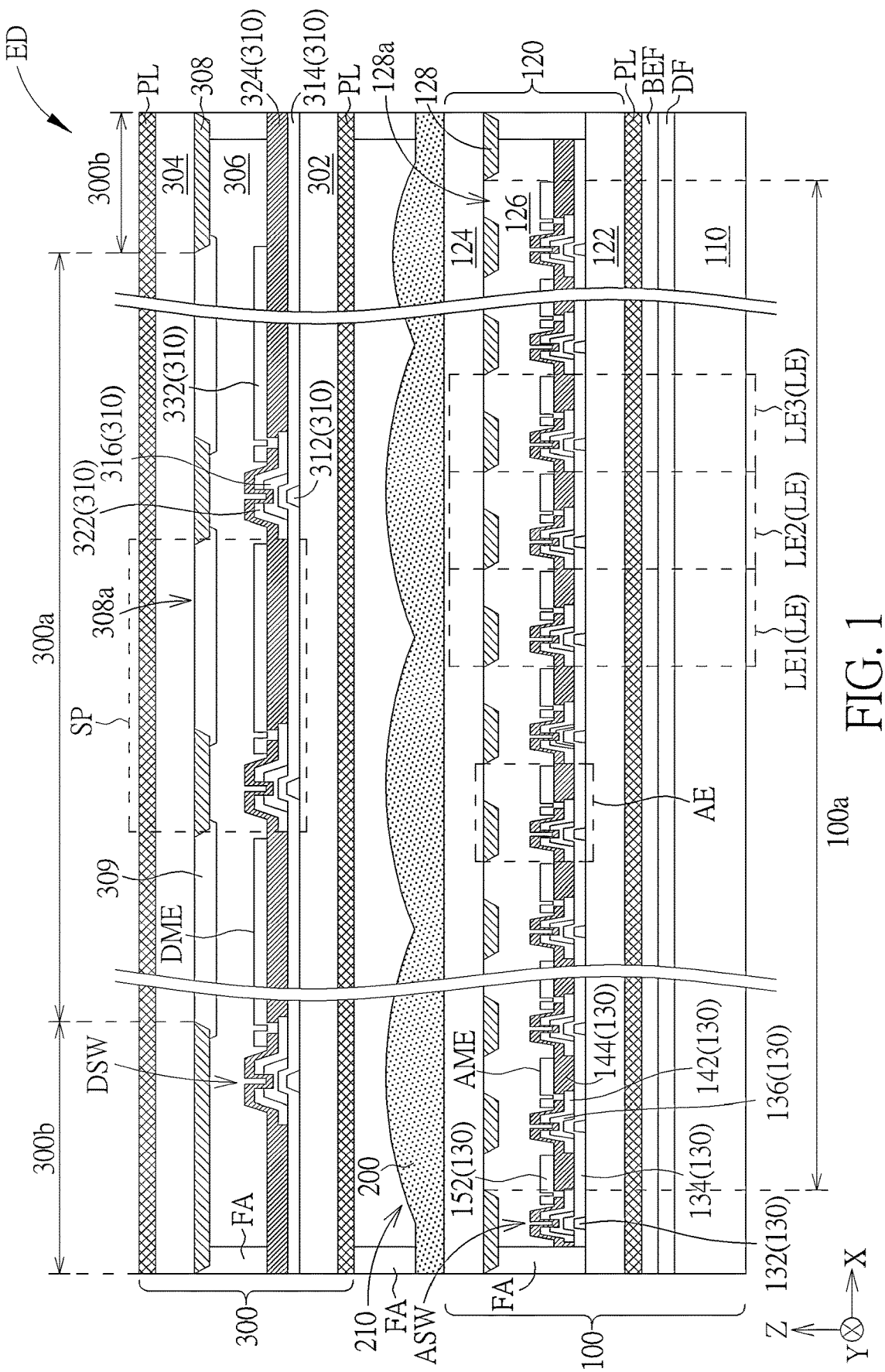
FIG. 1 is a schematic diagram showing a cross-sectional view of a display device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of a display device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

When the corresponding component such as layer or area is referred to "on another component (or the variant thereof)", it may be directly on this another component, or other component (s) may exist between them. On the other hand, when the component is referred to "directly on another component (or the variant thereof)", any component does not exist between them.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component (s).

The terms "about", "substantially", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the display device ED may be a flexible display, a flat panel display, a curved display or other suitable display. Furthermore, the display device ED may be a color display or a monochrome display, and a shape of the display device ED may be a rectangle, a circle, a polygon, a shape having a curved edge or other suitable shape.

Referring to FIG. 1, FIG. 1 is a schematic diagram showing a cross-sectional view of a display device according to a first embodiment of the present disclosure. As shown in FIG. 1, the display device ED of this embodiment includes a light emitting layer 100, a light adjusting layer 200 and a display layer 300. The light emitting layer 100 and the light adjusting layer 200 are disposed below the display layer 300. In the following, each structure will be described in detail. In the present disclosure, the light emitting layer 100 has a light emitting region 100a configured to provide suitable backlight for the light adjusting layer 200 and the display layer 300, and the light emitting layer 100 may control backlight brightness in each portion of the light emitting region 100a based on requirement (s). Specifically, in this embodiment, the light emitting layer 100 may have a plurality of light emitting units LE in the light emitting region 100a, and each of the light emitting units LE may be controlled individually, which achieve the individual control of the backlight brightness in each portion of the light emitting region 100a.

The light emitting layer 100 may be a self-luminous type or a non-self-luminous type, wherein the light emitting layer 100 with self-luminous type includes a light-emitting diode (LED), such as a micro-light-emitting diode (micro-LED) or a mini-light-emitting diode (mini-LED), an organic light-emitting diode (OLED), a quantum-dot light-emitting diode (QLED) or other suitable self-luminous component. In this embodiment, the light emitting layer 100 may be a non-self-luminous type, and may include a backlight source 110 and a light adjusting panel 120 disposed on the backlight source 110, wherein the backlight source 110 is a planar light source configured to provide initial backlight, and the light adjusting panel 120 not only adjusts transmittance of the initial backlight in each portion of the light emitting region 100a, but also adjusts the backlight brightness in each portion of the light emitting layer 100, but not limited thereto. The backlight source 110 may be a direct-type backlight source, an edge-type backlight source or other suitable backlight source, wherein the backlight source may include LED (such as micro-LED or mini-LED), OLED, QLED or other suitable light source. In addition, the backlight source 110 may emit such as white light, blue light or other suitable color light to be the initial backlight according to the type of the display device ED.

The light adjusting panel 120 includes a plurality of light switching structures AE controlling the transmittance of the initial backlight by electric signal, and the light switching structure AE may include a corresponding component based on the switching method. Specifically, in this embodiment, the light adjusting panel 120 may include a first light adjusting substrate 122, a light adjusting circuit layer 130, a light adjusting medium layer 126, a light adjusting shielding layer 128 and a second light adjusting substrate 124, wherein the light adjusting circuit layer 130, the light adjusting medium layer 126, the light adjusting shielding layer 128 may be disposed between the first light adjusting substrate 122 and the second light adjusting substrate 124 and form the light switching structures AE, but the structures had in the light adjusting panel 120 and the disposed position of each structure are not limited thereto. In the display device ED, the second light adjusting substrate 124 is disposed between the display layer 300 and the first light adjusting substrate 122. In other embodiment, the light adjusting panel 120 may include mechanical type switching structures; for instance, the light switching structures AE may be a micro electro mechanical system (MEMS) and/or a digital micromirror device (DMD) to control whether the initial backlight passes or not. The material of the first light adjusting substrate 122 and the material of the second light adjusting substrate 124 may individually include glass, quartz, sapphire, polyimide (PI), polyethylene terephthalate (PET) and/ or other suitable material, such that each of the first light adjusting substrate 122 and the second light adjusting substrate 124 may be a flexible substrate or a hard substrate, but not limited thereto. The material of the first light adjusting substrate 122 may be the same as or different from the material of the second light adjusting substrate 124.

The light adjusting circuit layer 130 is disposed on the first light adjusting substrate 122, and includes at least one conductive layer, at least one insulating layer and/or at least one semiconductor layer. For example, in this embodiment shown in FIG. 1, the light adjusting circuit layer 130 is disposed on the first light adjusting substrate 122, and includes a first conductive layer 132, a first insulating layer 134, a first semiconductor layer 136, a second conductive layer 142, a second insulating layer 144 and a third conductive layer 152 stacked in sequence along a direction Z, but not limited thereto. In this embodiment, the light adjusting circuit layer 130 may include a plurality of light adjusting switching components ASW (e.g., thin film transistors formed of the first conductive layer 132, the first insulating layer 134, the first semiconductor layer 136, the second conductive layer 142 and the second insulating layer 144) and a plurality of controlling electrodes AME (e.g., the third conductive layer 152) disposed in the light emitting region 100a. In the light adjusting switching component ASW of FIG. 1, a gate may be formed of the first conductive layer 132, a source and a drain may be formed of the second conductive layer 142, and a channel layer may be formed of the first semiconductor layer 136, such that the light adjusting switching component ASW is such as a bottom gate transistor, but not limited thereto. Based on requirement (s), the bottom gate transistor may be replaced by a top gate transistor, a double gate transistor or other suitable transistor. The type of the light adjusting switching component ASW may be modified based on designed requirement (s). In FIG. 1, the controlling electrode AME may be formed of the third conductive layer 152, and the controlling electrode AME may be electrically connected to the drain of the light adjusting switching component ASW. Moreover, the material of the conductive layer of the light adjusting circuit layer 130 may include metal, transparent conductive material, such as indium tin oxide (ITO) or indium zinc oxide (IZO), other suitable conductive material or combination thereof. The insulating layer of the light adjusting circuit layer 130 may include such as silicon oxide, silicon nitride, silicon oxynitride, other suitable insulating material or combination thereof. The semiconductor layer of the light adjusting circuit layer 130 may include such as polycrystalline silicon, amorphous silicon, metal oxide semiconductor, other suitable semiconductor material or combination thereof. In this embodiment, the first conductive layer 132 and the second conductive layer 142 may include the conductive material with low resistance (e.g., metal), and the third conductive layer 152 may include transparent conductive material, but not limited thereto.

In addition, the light adjusting circuit layer 130 of this embodiment may further optionally include a light adjusting driving circuit, at least one light adjusting data line and at least one light adjusting scan line, wherein the light adjusting driving circuit may be disposed outside the light emitting region 100a of the light emitting layer 100, and the light adjusting data line and the light adjusting scan line may be connected between the light adjusting driving circuit and the light adjusting switching component ASW. The light adjusting driving circuit may transmit a light adjusting renew signal to the gate of the light adjusting switching component ASW through the light adjusting scan line, and transmit a light adjusting gray-scale signal to the source of the light adjusting switching component ASW through the light adjusting data line. When the light adjusting switching component ASW is turned on, the light adjusting gray-scale signal passes through the channel layer and the drain of the light adjusting switching component ASW to the controlling electrode AME from the source of the light adjusting switching component ASW. In this embodiment, the light adjusting scan line may be formed of the first conductive layer 132, the light adjusting data line may be formed of the second conductive layer 142, and the light adjusting scan line and the light adjusting data line may extend along different directions (for example, but not limited to, along a direction X and a direction Y respectively).

The light adjusting medium layer 126 is disposed on the light adjusting circuit layer 130, and the controlling electrode AME may control the transparency or the gray scale of the light adjusting medium layer 126 according to the received light adjusting gray-scale signal, so as to control the intensity of the initial backlight (provided by the backlight source 110) passing through the light adjusting medium layer 126 (i.e., the backlight intensity of the light emitting layer 100). The light adjusting medium layer 126 may include liquid crystal, electrophoresis or other medium of which the transparency can be changed by electric signal. In this embodiment, the light adjusting medium layer 126 may include the liquid crystal, but not limited thereto. Note that, each of the light emitting units LE of the light emitting layer 100 of this embodiment may optionally include one of the light adjusting switching components ASW, the controlling electrode AME electrically connected to this light adjusting switching component ASW, a portion of the light adjusting medium layer 126 corresponding to this controlling electrode AME, a portion of the light adjusting shielding layer 128 corresponding to this light adjusting switching component ASW and a portion of the backlight source 110 corresponding to the controlling electrode AME. In the light emitting unit LE, the light adjusting switching component ASW, the controlling electrode AME, the portion of the light adjusting medium layer 126 and the portion of the light adjusting shielding layer 128 may optionally form the light switching structure AE.

In this embodiment, the controlling electrodes AME of the light switching structures AE in different light emitting units LE may receive the same light adjusting gray-scale signal or different light adjusting gray-scale signals, so as to adjust the transparency of the light adjusting medium layer 126 in different light emitting units LE, thereby controlling the backlight intensities of the light emitting units LE. For instance, the light adjusting gray-scale signal provided by the light adjusting driving circuit of this embodiment may have two types: a high gray-scale value making the light emitting unit LE brightest (e.g., the initial backlight highly passes through the light adjusting medium layer 126) and a low gray-scale value making the light emitting units LE darkest (e.g., the initial backlight lowly passes through the light adjusting medium layer 126); that is to say, the backlight intensity generated by each of the light emitting units LE of this embodiment may have two types, but not limited thereto. Note that, in order to describe in the following briefly, when the light emitting unit LE receives a high light adjusting gray-scale signal (the controlling electrode AME of the light emitting unit LE of this embodiment receives high gray-scale value) to generate a high backlight intensity, it can be referred as "the light emitting unit LE is turned on (or the light switching structure AE is turned on)"; when the light emitting unit LE receives a low light adjusting gray-scale signal (the controlling electrode AME of the light emitting unit LE of this embodiment receives the low gray-scale value) to generate a low backlight intensity, it can be referred as "the light emitting unit LE is turned off (or the light switching structure AE is turned off)". In particular, in this description, the turned-off light emitting unit LE represents that the backlight intensity of the light emitting unit LE is less than 20% of the highest backlight intensity (i.e., in a highest gray-scale state).

In this embodiment, the light adjusting shielding layer 128 is disposed on the second light adjusting substrate 124, the light adjusting shielding layer 128 is configured to separate the light emitting region 100a into a plurality of parts, and shields the opaque structure (s) or the structure (s) capable of reflecting light (e.g., the light adjusting switching components ASW) in the direction Z, wherein the light adjusting shielding layer 128 has a plurality of opening units 128a, and each opening unit 128a corresponds to at least one of the light emitting units LE in the direction Z. In this embodiment, each opening unit 128a corresponds to the controlling electrode AME of one of the light emitting units LE in the direction Z, but not limited thereto. The light adjusting shielding layer 128 may be disposed at any suitable position in the light emitting layer 100. For instance, the light adjusting shielding layer 128 of this embodiment is disposed between the light adjusting medium layer 126 and the second light adjusting substrate 124; in other embodiments, the light adjusting shielding layer 128 is disposed between the light adjusting medium layer 126 and the first light adjusting substrate 122, but not limited thereto. Moreover, in this embodiment, the size of the opening unit 128a (e.g., the width in the cross-sectional view) may be less than the size of the light emitting unit LE, and the backlight generated by each light emitting unit LE emits to pass through the corresponding opening units 128a.

The display layer 300 is disposed on the light emitting layer 100 (e.g., the second light adjusting substrate 124 of this embodiment is disposed between the display layer 300 and the first light adjusting substrate 122), and the display layer 300 has a display region 300a and at least one peripheral region 300b outside of the display region 300a, wherein the peripheral region 300b may be configured to provide required signal (s) for the display region 300a, so as to make a plurality of pixels in the display region 300a correspondingly display an image with the backlight. In this embodiment, the peripheral region 300b surrounds the display region 300a, but not limited thereto. Note that, each pixel of the display region 300a may include one or more sub-pixel (s) SP; for example, if the display device ED is a monochrome display, each pixel may include one sub-pixel SP, and if the display device ED is a color display, each pixel may include such as three sub-pixels SP, but not limited thereto. In detail, the display layer 300 may include a first display substrate 302, a display circuit layer 310, a display medium layer 306, a display shielding layer 308 and a second display substrate 304, wherein the display circuit layer 310, the display medium layer 306, the display shielding layer 308 may be disposed between the first display substrate 302 and the second display substrate 304, but the disposed position of each structure is not limited thereto. The material of the first display substrate 302 and the material of the second display substrate 304 may individually include glass, quartz, sapphire, PI, PET and/or other suitable material, such that each of the first display substrate 302 and the second display substrate 304 may be a flexible substrate or a hard substrate, but not limited thereto. The first light adjusting substrate 122, the second light adjusting substrate 124, the first display substrate 302 and the second display substrate 304 may have the same material or different materials.

The display circuit layer 310 is disposed on the first display substrate 302, and includes at least one conductive layer, at least one insulating layer and/or at least one semiconductor layer. For example, in this embodiment shown in FIG. 1, the display circuit layer 310 is disposed on the first display substrate 302, and includes a fourth conductive layer 312, a third insulating layer 314, a second semiconductor layer 316, a fifth conductive layer 322, a fourth insulating layer 324 and a sixth conductive layer 332 stacked in sequence along the direction Z, but not limited thereto. In this embodiment, the display circuit layer 310 may include a plurality of display switching components DSW (e.g., thin film transistors formed of the fourth conductive layer 312, the third insulating layer 314, the second semiconductor layer 316, the fifth conductive layer 322 and the fourth insulating layer 324) and a plurality of controlling electrodes DME (e.g., the sixth conductive layer 332) disposed in the display region 300a. In the display switching component DSW of FIG. 1, a gate may be formed of the fourth conductive layer 312, a source and a drain may be formed of the fifth conductive layer 322, and a channel layer may be formed of the second semiconductor layer 316, such that the display switching component DSW is such as a bottom gate transistor, but not limited thereto. The type of the display switching component DSW may be modified based on designed requirement (s). In FIG. 1, the controlling electrode DME may be formed of the sixth conductive layer 332, and the controlling electrode DME may be electrically connected to the drain of the display switching component DSW. Furthermore, the material of the conductive layer in the display circuit layer 310 may include metal, transparent conductive material (such as ITO or IZO) other suitable conductive material or combination thereof. The insulating layer of the display circuit layer 310 may include material (s) such as silicon oxide, silicon nitride, silicon oxynitride, other suitable insulating material or combination thereof. The semiconductor layer of the display circuit layer 310 may include material (s) such as polycrystalline silicon, silicon, amorphous metal oxide semiconductor, other suitable semiconductor material or combination thereof. In this embodiment, the fourth conductive layer 312 and the fifth conductive layer 322 may include the conductive material with low resistance (e.g., metal), and the sixth conductive layer 332 may include transparent conductive material, but not limited thereto.

Moreover, the display circuit layer 310 of this embodiment may further optionally include a display driving circuit, at least one display data line and a least one display scan line, wherein the display driving circuit is situated in the peripheral region 300b, and the display data line and the display scan line may be connected between the display driving circuit and the display switching component DSW. The display driving circuit may transmit a display renew signal to the gate of the display switching component DSW through the display scan line, and transmit a display grayscale signal to the source of the display switching component DSW through the display data line. When the display switching component DSW is turned on, the display grayscale signal passes through the channel layer and the drain of the display switching component DSW to the controlling electrode DME from the source of the display switching component DSW. In this embodiment, the display scan line may be formed of the fourth conductive layer 312, the display data line may be formed of the fifth conductive layer 322, and the display scan line and the display data line may extend along different directions (for example, but not limited to, along the direction X and the direction Y respectively). In addition, in other embodiment, the display driving circuit of the display circuit layer 310 may be electrically connected to the light adjusting driving circuit of the light adjusting circuit layer 130, but not limited thereto. In other embodiments, the light adjusting driving circuit may be disposed in the display circuit layer 310, and may be electrically connected to the component (s) of the light adjusting circuit layer 130 through such as outer trace (s), but not limited thereto.

The display medium layer 306 is disposed on the display circuit layer 310, and the controlling electrode DME may control the transparency or the gray scale of the display medium layer 306 according to the received display grayscale signal, so as to control the intensity of the backlight (provided by the light emitting layer 100) passing through the display medium layer 306. The display medium layer 306 may include liquid crystal, electrophoresis or other medium of which the transparency can be changed by electric signal. In this embodiment, the display medium layer 306 may include the liquid crystal, but not limited thereto. Note that, each of the sub-pixels SP of the display layer 300 of this embodiment may optionally include the display switching component DSW, the controlling electrode DME (or referred as a pixel electrode) electrically connected to this corresponding display switching component DSW, a portion of the display medium layer 306 corresponding to this controlling electrode DME, a portion of the display shielding layer 308 corresponding to this display switching component DSW and a light color converting layer 309 corresponding to this controlling electrode DME. In this embodiment, the controlling electrodes DME in different sub-pixels SP may receive the same display gray-scale signal or different display gray-scale signals, so as to adjust the transparency of the display medium layer 306 in different sub-pixels SP, thereby controlling the light intensities of the light passing through the sub-pixels SP. Based on the required display image, the display driving circuit of this embodiment may correspondingly provide the suitable display gray-scale signals for the controlling electrodes DME of the sub-pixels SP, so as to generate the corresponding light intensities.

In this embodiment, the display shielding layer 308 is disposed on the second display substrate 304, the display shielding layer 308 is configured to separate the display region 300a of the display layer 300 into a plurality of parts, and shields the opaque structure (s) or the structure (s) capable of reflecting light (e.g., the display switching components DSW) in the direction Z, wherein the display shielding layer 308 has a plurality of sub-pixel openings 308a, and each sub-pixel opening 308a corresponds to one of the sub-pixels SP in the direction Z. The display shielding layer 308 may be disposed at any suitable position in the display layer 300. For instance, the display shielding layer 308 of this embodiment is disposed between the display medium layer 306 and the second display substrate 304; in other embodiments, the display shielding layer 308 is disposed between the display medium layer 306 and the first display substrate 302, but not limited thereto. Moreover, in this embodiment, the size of the sub-pixel openings 308a (e.g., the width in the cross-sectional view) may be less than the size of the sub-pixels SP, and the light passing through the sub-pixels SP emits to pass through the corresponding sub-pixel openings 308a.

In addition, the display layer 300 may further include other component (s), structure (s) and/or layer (s) disposed at the suitable position (s). For example, in FIG. 1, the display layer 300 further includes the light color converting layer 309 disposed between the display medium layer 306 and the second display substrate 304, and each portion of the light color converting layer 309 is disposed to be corresponding to the sub-pixel opening 308a of the display shielding layer 308, such that the sub-pixels SP may generate the lights with different colors, so as to make the display device ED display the color image. The light color converting layer 309 may include color filter material, quantum-dot or other suitable light color converting material. In an embodiment, if the light emitting layer 100 emits the white backlight, each portion of the light color converting layer 309 may convert the white backlight into one of red light, green light or blue light; in another embodiment, if the light emitting layer 100 emits the blue backlight, each portion of the light color converting layer 309 may convert the blue backlight into one of red light or green light, but not limited thereto. Moreover, in other embodiments, the light adjusting panel 120 may include the light color converting layer 309 disposed to be corresponding to the opening units 128a of the light adjusting shielding layer 128.

The light adjusting layer 200 is disposed to be corresponding to the light emitting layer 100, and the display layer 300 is disposed on the light adjusting layer 200. Specifically, the light adjusting layer 200 may be disposed between the display layer 300 and the light emitting layer 100, or disposed in the light emitting layer 100. For example, the light adjusting layer 200 may be disposed between the display layer 300 and the light adjusting panel 120, be disposed in the light adjusting panel 120, or be disposed between the light adjusting panel 120 and the backlight source 110, but not limited thereto. In FIG. 1, the light adjusting layer 200 of this embodiment is disposed between the display layer 300 and the light adjusting panel 120 (i.e., the light adjusting layer 200 is disposed on the backlight source 110), and the light adjusting layer 200 is disposed on a surface of the second light adjusting substrate 124 facing the display layer 300. In the present disclosure, the light adjusting layer 200 may include at least one light adjusting structure 210. Note that, if the light adjusting layer 200 includes a plurality of light adjusting structures 210, it means that the light adjusting layer 200 has a plurality of repeated units, the repeated units are arranged in a direction perpendicular to the direction Z (such as the direction X and/or the direction Y), and each repeated unit may be defined as one of the light adjusting structures 210.

In this embodiment, as shown in FIG. 1, each light adjusting structure 210 corresponds to at least three of the light emitting units LE of the light emitting layer 100, and/or each light adjusting structure 210 corresponds to at least three of the opening units 128a of the light adjusting panel 120, but not limited thereto. Note that, in this embodiment, when the light adjusting structure 210 corresponds to the light emitting units LE or the opening units 128a, the light adjusting structure 210 overlaps the corresponding light emitting units LE or the corresponding opening units 128a in the direction Z, but not limited thereto. In order to describe in the following briefly, three light emitting units LE corresponding to the same light adjusting structure 210 are referred as a first light emitting unit LE1, a second light emitting unit LE2 and a third light emitting unit LE3 respectively. In FIG. 1 to FIG. 4, FIG. 6 and FIG. 11, the first light emitting unit LE1, the second light emitting unit LE2 and the third light emitting unit LE3 are arranged from left to right in sequence.

Moreover, the display device ED may further include other suitable layer (s), component (s) and/or structure (s) based on requirement (s). In this embodiment, as shown in FIG. 1, the display device ED may include a sealant FA, the sealant FA may adhere to the first display substrate 302 and the second display substrate 304 of the display layer 300, and may adhere between the first light adjusting substrate 122 and the second light adjusting substrate 124 of the light adjusting panel 120. Also, the sealant FA of this embodiment may further adhere between the display layer 300 and the light adjusting layer 200. The sealant FA may have a material with adhering property, such as a polyurethane (PU) foam glue, but not limited thereto. Furthermore, the sheet type sealant FA may be disposed. In other embodiment, the sealant FA may be a fluid glue type, and be disposed by a coating method, but not limited thereto. In other embodiments, the display layer 300 and the light adjusting layer 200 may be adhered by an overall adhering layer or a pattern adhering layer disposed therebetween. Moreover, the display device ED of this embodiment may optionally include an optical layer, such as a diffuser DF, a brightness enhancement film BEF, a polarizer PL, but not limited thereto. The display device ED of this embodiment includes three polarizers PL respectively disposed on the first light adjusting substrate 122 of the light adjusting panel 120, on the first display substrate 302 of the display layer 300 and on the second display substrate 304 of the display layer 300, but not limited thereto. In other embodiments, the display device ED may further include a fourth polarizer PL disposed between the second light adjusting substrate 124 of the light adjusting panel 120 and the light adjusting layer 200. In this embodiment, the polarizer on the first display substrate 302 and the polarizer on the second light adjusting substrate 124 have the same optic axis. In the case that four polarizers PL are included, the light adjusting layer 200 may be disposed on another substrate (not shown in figures), and this substrate may be adhered on the polarizer PL on the second light adjusting substrate 124 by an adhering layer, but not limited thereto.

Figure 2:
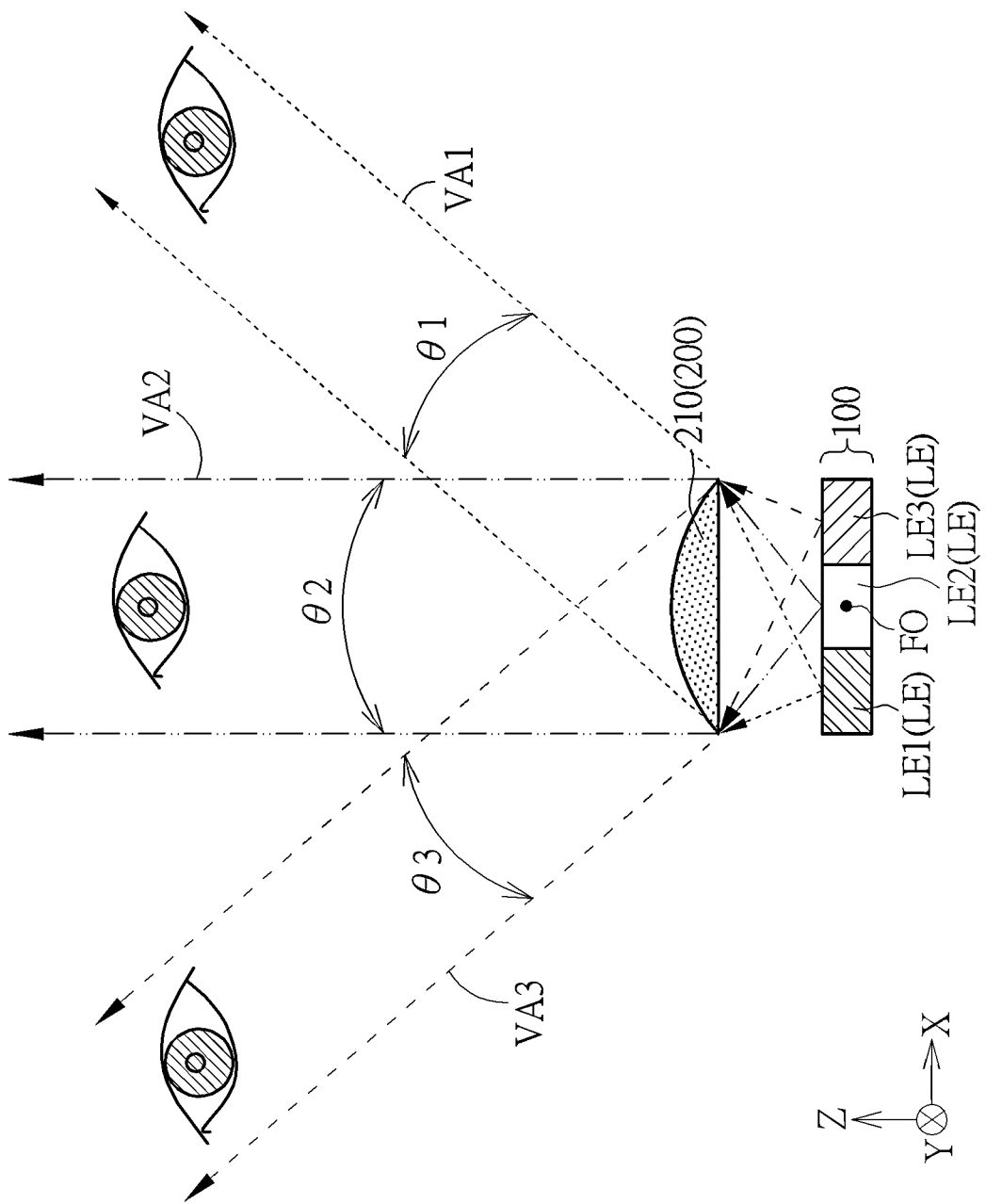
FIG. 2 is a schematic diagram showing a viewing-angle control regarding one light adjusting structure and light emitting units corresponding to this light adjusting structure of the display device according to the first embodiment of the present disclosure.

Referring to FIG. 2 and further referring FIG. 1, FIG. 2 is a schematic diagram showing a viewing-angle control regarding one light adjusting structure and light emitting units corresponding to this light adjusting structure of the display device according to the first embodiment of the present disclosure, wherein FIG. 2 omits the display layer 300 and simplifies the structure of the light emitting layer 100 in order to make FIG. 2 simple and clear. As shown in FIG. 1 and FIG. 2, the light adjusting structure 210 of the light adjusting layer 200 is configured to adjust, change and/or select the light-progressing direction(s) of the initial backlight generated by the backlight source 110 or the backlight generated by the light emitting units LE. In detail, since the light-progressing directions of the initial backlight generated by the backlight source 110 and/or the light-progressing directions of the backlight generated by the light emitting units LE extend along various directions, when these lights pass through the light adjusting structures 210 of the light adjusting layer 200, the light adjusting structures 210 may correspondingly adjust and/or change these lights into the lights progressing along specific direction(s), and/or the light adjusting structures 210 may select the light(s) progressing along specific direction(s). In order to make the light adjusting structure 210 of the light adjusting layer 200 have a function of adjusting, changing and/or selecting the light-progressing direction, the light adjusting structure 210 may include one or more of a lens structure, a prism structure and a shielding structure, but not limited thereto. The light adjusting structure 210 may be designed based on the requirement of the light-progressing direction.

In this embodiment, each light adjusting structure 210 may include one convex lens structure to adjust and/or change the light-progressing direction, and at least one of the light emitting units LE (e.g., the second light emitting unit LE2) may be situated at a focal point FO of this convex lens structure, but not limited thereto. In other embodiments, the light emitting units LE (e.g., the second light emitting unit LE2) may not be situated at the focal point FO of this convex lens structure. Moreover, in other embodiments, one light adjusting structure 210 may include a plurality of convex lens structures, and each of the convex lens structures may have different focal lengths and/or different shapes. In other embodiments, one light adjusting structure 210 may include one lens structure and one prism structure. In particular, in the light emitting units LE (or the opening units 128a) corresponding to the same light adjusting structure 210, different light emitting units LE (or different opening units 128a) correspond different portions of this light adjusting structure 210 respectively. Thus, after the backlights generated from different light emitting units LE (or the backlights passing through different opening units 128a) pass through this light adjusting structure 210, these backlights have different light-progressing directions. For instance, in FIG. 2, after the backlights emitting from the first light emitting unit LE1, the second light emitting unit LE2 and the third light emitting unit LE3 to the light adjusting layer 200 pass through the light adjusting structure 210 of the light adjusting layer 200, the backlight generated by the first light emitting unit LE1 situated on the left side may progress in a front right direction, the backlight generated by the second light emitting unit LE2 situated at middle may progress in a direction parallel to the direction Z, the backlight generated by the third light emitting unit LE3 situated on the right side may progress in a front left direction, but not limited thereto.

In this embodiment, since the backlights generated by the first light emitting unit LE1, the second light emitting unit LE2 and the third light emitting unit LE3 may have different light-progressing directions after passing through the same light adjusting structure 210, when the first light emitting unit LE1, the second light emitting unit LE2 and the third light emitting unit LE3 are turned on, the user may see the backlights provided by different light emitting units LE in the different viewing-angles. For example, in FIG. 2, the user may see the backlight generated by the first light emitting unit LE1 when the user views on the front right side of the light adjusting structure 210, the user may see the backlight generated by the third light emitting unit LE3 when the user views on the front left side of the light adjusting structure 210, and the user may see the backlight generated by the second light emitting unit LE2 when the user views on the front side (between the front left side and the front right side) of the light adjusting structure 210, but not limited thereto. Therefore, in the three light emitting units LE corresponding to the same light adjusting structure 210 of this embodiment, the first light emitting unit LE1 provides the backlight for the user to view from a first viewing-angle VA1, the second light emitting unit LE2 provides the backlight for the user to view from a second viewing-angle VA2, and the third light emitting unit LE3 provides the backlight for the user to view from a third viewing-angle VA3. For instance, in FIG. 2, the display device ED may provide the viewing-angle with 120 degrees, and an included angle θ1 of the first viewing-angle VA1, an included angle θ2 of the second viewing-angle VA2 and an included angle θ3 of the third viewing-angle VA3 may be the same or different, but not limited thereto. In other embodiment, the display device ED may provide the viewing-angle with approximate 180 degrees, and the included angle θ2 of the second viewing-angle VA2 may be greater than the included angle θ1 of the first viewing-angle VA1 and the included angle θ3 of the third viewing-angle VA3, but not limited thereto.

Figure 3:
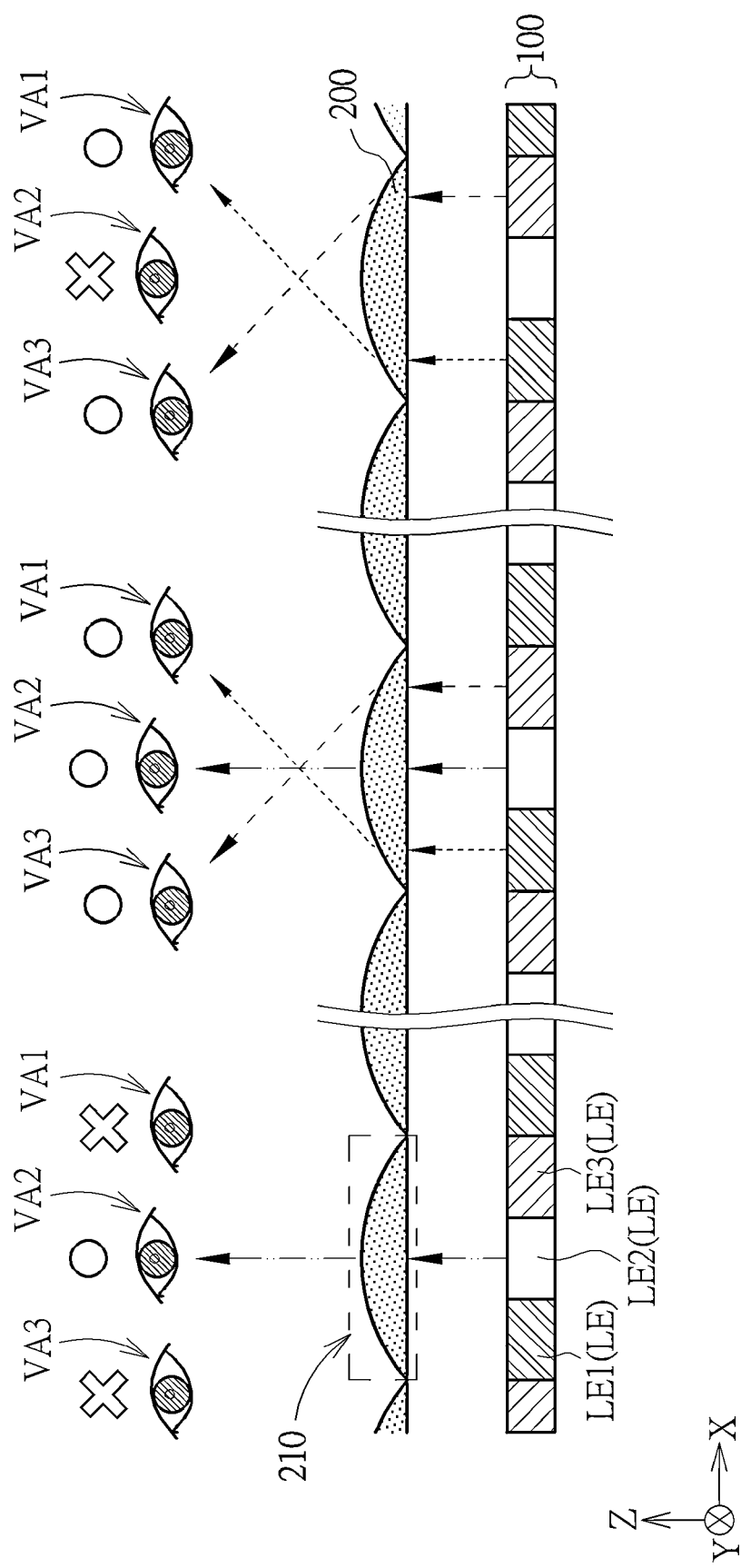
FIG. 3 is a schematic diagram showing a viewing-angle control regarding a plurality of light adjusting structures and light emitting units corresponding to these light adjusting structures according to the first embodiment of the present disclosure.

Referring to FIG. 3 and further referring FIG. 2, FIG. 3 is a schematic diagram showing a viewing-angle control regarding a plurality of light adjusting structures and light emitting units corresponding to these light adjusting structures according to the first embodiment of the present disclosure, wherein in order to make FIG. 3 simple and clear, FIG. 3 omits the display layer 300 and simplifies the structure of the light emitting layer 100, and FIG. 3 shows that each light emitting unit LE and its corresponding one light parallel to the direction Z as an example (actually, the light emitting unit LE may emit the lights with various directions). As shown in FIG. 2 and FIG. 3, the user may control the switching status of each light emitting unit LE of the display device ED of this embodiment based on the viewing requirement of him/her. For example, in three light emitting units LE corresponding to the light adjusting structure 210 shown in the middle of FIG. 3, since these three light emitting units LE are turned on, the user may view from the first viewing-angle VA1, the second viewing-angle VA2 and the third viewing-angle VA3; in three light emitting units LE corresponding to the light adjusting structure 210 shown in the left side of FIG. 3, since the second light emitting unit LE2 is turned on only, the user may only view from the second viewing-angle VA2, and not view from the first viewing-angle VA1 and the third viewing-angle VA3; in three light emitting units LE corresponding to the light adjusting structure 210 shown in the right side of FIG. 3, since the first light emitting unit LE1 and the third light emitting unit LE3 are turned on, the user may view from the first viewing-angle VA1 and the third viewing-angle VA3, and not view from the second viewing-angle VA2.

Figure 4:
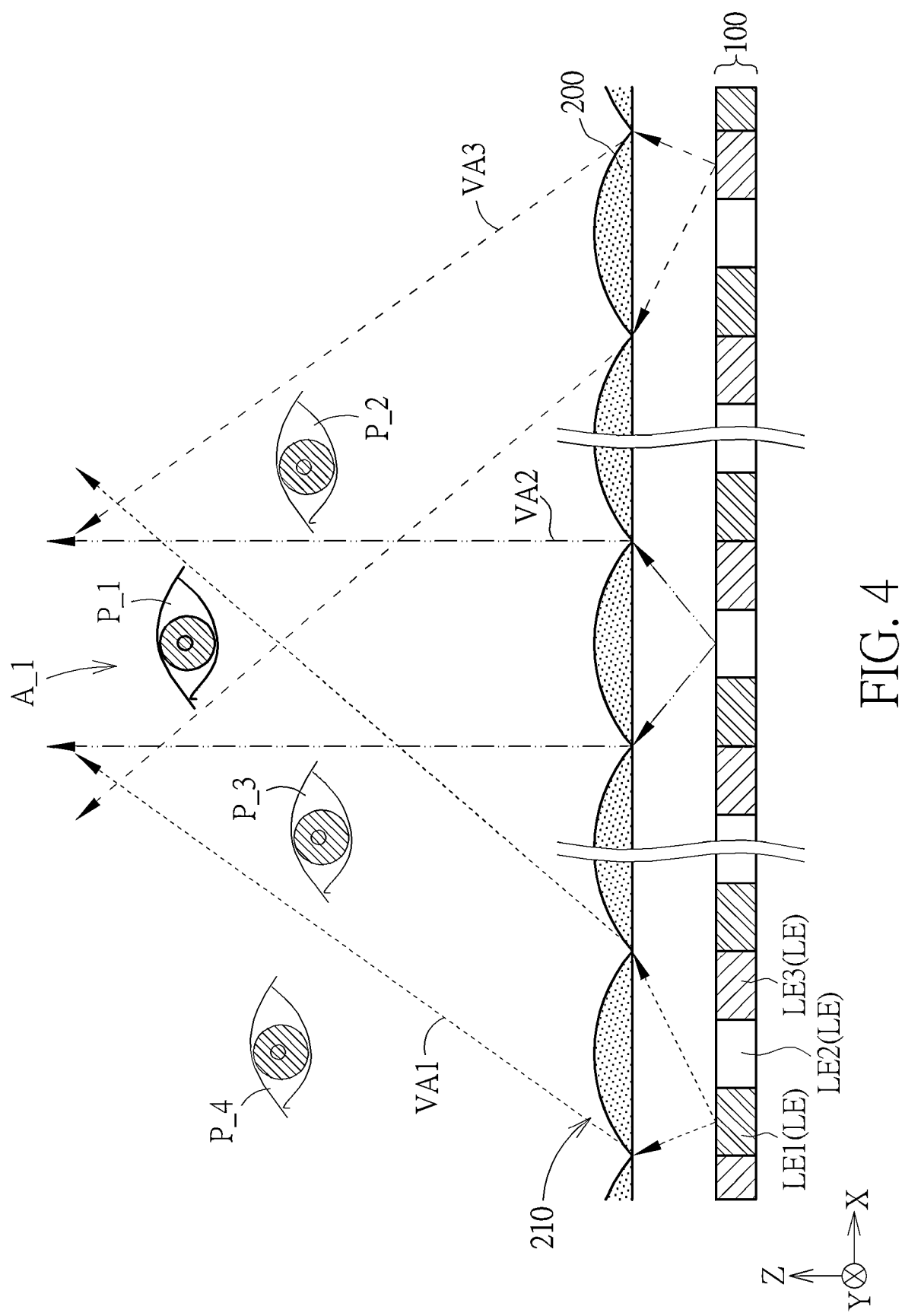
FIG. 4 is a schematic diagram showing a viewing-angle control of the display device according to the first embodiment of the present disclosure.

Some cases of the viewing-angle control of the display device ED of this embodiment are explained in the following, and the display region 300a of the display device ED may be divided into such as three regions (i.e., a left-side region, a middle region and a right-side region), such that the switching statuses of the light emitting units LE in each region are controlled respectively, but the case of the viewing-angle control, the operation method, the region-divided method of and the number of the regions are not limited thereto. In other embodiment, the display region 300a of the display device ED may be divided into more regions. Referring to FIG. 4, FIG. 4 is a schematic diagram showing a viewing-angle control of the display device according to the first embodiment of the present disclosure, wherein FIG. 4 omits the display layer 300 and simplifies the structure of the light emitting layer 100. As shown in FIG. 4, in the left-side region of the display device ED, the first light emitting unit LE1 is turned on, and the second light emitting unit LE2 and the third light emitting unit LE3 are turned off, such that the user views the left-side region of the display device ED from the first viewing-angle VA1; in the middle region of the display device ED, the second light emitting unit LE2 is turned on, and the first light emitting unit LE1 and the third light emitting unit LE3 are turned off, such that the user views the middle region of the display device ED from the second viewing-angle VA2; in the right-side region of the display device ED, the third light emitting unit LE3 is turned on, and the first light emitting unit LE1 and the second light emitting unit LE2 are turned off, such that the user views the right-side region of the display device ED from the third viewing-angle VA3. Therefore, the user views the entire display image displayed by the display device ED in an area A_1 (e.g., a position P_1) only where the first viewing-angle VA1, the second viewing-angle VA2 and the third viewing-angle VA3 intersect. The user in another region may only view the partial display image or may not view the display image; for instance, the user at a position P_2 corresponding to the third viewing-angle VA3 may only view the display image displaying in the right-side region, the user at a position P_3 corresponding to the first viewing-angle VA1 may only view the display image displaying in the left-side region, the user at a position P_4 which the backlight does not pass through may not view the display image.

On the other hand, the display device ED of the present disclosure may include a position tracking sensor configured to track the head, eyes and/or face of the user. As shown in FIG. 2, when a privacy screen function of the display device ED is turned on, the display device ED may turn on the suitable light emitting units LE based on the position of the user sensed by the position tracking sensor, such that the user may view the entire display image in the viewing region where the user is situated, and the partial display image or no display image may be viewed in other viewing regions. Furthermore, when the user moves, the position tracking sensor may sense the position change of the user, such that the display device ED may adjust the switching statuses of the light emitting units LE based on the current position of the user, such that the viewing region where the entire display image can be viewed is adjusted. Thus, the user may still view the entire display image after moving.

According to the above, because the display device ED of this embodiment has the light adjusting layer 200, the light-progressing direction of the backlight may be adjusted, changed and/or selected by controlling the switching status of each light emitting unit LE and using the light adjusting structure 210 of the light adjusting layer 200, so as to control the position where the entire display image displayed by the display device ED can be viewed or control the position where the partial display image displayed by the display device ED can be viewed based on requirement (s), so as to achieve the privacy screen function. Moreover, in this embodiment, for instance, all of the light emitting units LE may be turned on to turn off the privacy screen function of the display device ED. In addition, since only the switching statuses of the light emitting units LE provided the backlight is controlled, the resolution of the display layer 300 may not be influenced even if the number of the turned-on light emitting units LE is different. In other words, the resolution of the display layer 300 may not be changed even if the privacy screen function of the display device ED is performed.

In the present disclosure, in order to make all sub-pixels SP of the display layer 300 be irradiated by the backlight generated by the light emitting units LE of the light emitting layer 100, the area of the light emitting region 100a of the light emitting layer 100 may be greater than or equal to the area of the display region 300a of the display layer 300. For example, in FIG. 1, the area of the light emitting region 100a of the light emitting layer 100 is greater than the area of the display region 300a of the display layer 300. Moreover, in the present disclosure, the corresponding relation and the number relation between the sub-pixels SP of the display layer 300 and the light emitting units LE of the light emitting layer 100 are not limited particularly. For example, in this embodiment, the size (e.g., the width in the cross-sectional view) of one of the sub-pixels SP of the display layer 300 may be greater than the size (e.g., the width in the cross-sectional view) of one of the light emitting units LE of the light emitting layer 100, and the number of the sub-pixels SP may be less than the number of the light emitting units LE, but not limited thereto. In other embodiments, the number of the sub-pixels SP may be less than or equal to the number of the light emitting units LE. In other embodiments, the size (e.g., the width in the cross-sectional view) of the sub-pixel SP may be less than or equal to the size (e.g., the width in the cross-sectional view) of the light emitting unit LE. Note that, in the light emitting units LE (or the opening units 128a) corresponding to the same light adjusting structure 210, for instance, the sub-pixel (s) SP irradiated by the first light emitting unit LE1, the sub-pixel (s) SP irradiated by the second light emitting unit LE2 and the sub-pixel (s) SP irradiated by the third light emitting unit LE3 may be totally the same, partially the same or totally different, and the numbers of the sub-pixels SP irradiated by the first light emitting unit LE1, the second light emitting unit LE2 and the third light emitting unit LE3 may be the same or different.

In addition, when one light adjusting structure 210 corresponds to more light emitting units LE (or the opening units 128a), the light-progressing directions may be divided into more groups to control the viewing-angle more precisely, thereby enhancing the privacy screen function. Furthermore, the viewing-angle provided by the display device ED may be any suitable angle. In the light emitting units LE (or the opening units 128a) corresponding to the same light adjusting structure 210, each of the light emitting units LE may provide the users with the same viewing-angle or different viewing-angles.

The display device of the present disclosure is not limited to the above embodiments. Further embodiments of the present disclosure are described below. In order to simplify the explanation and highlight the differences between the embodiments, the same components will be labeled with the same symbol in the following, and the repeated parts will not be redundantly described.

Figure 5:
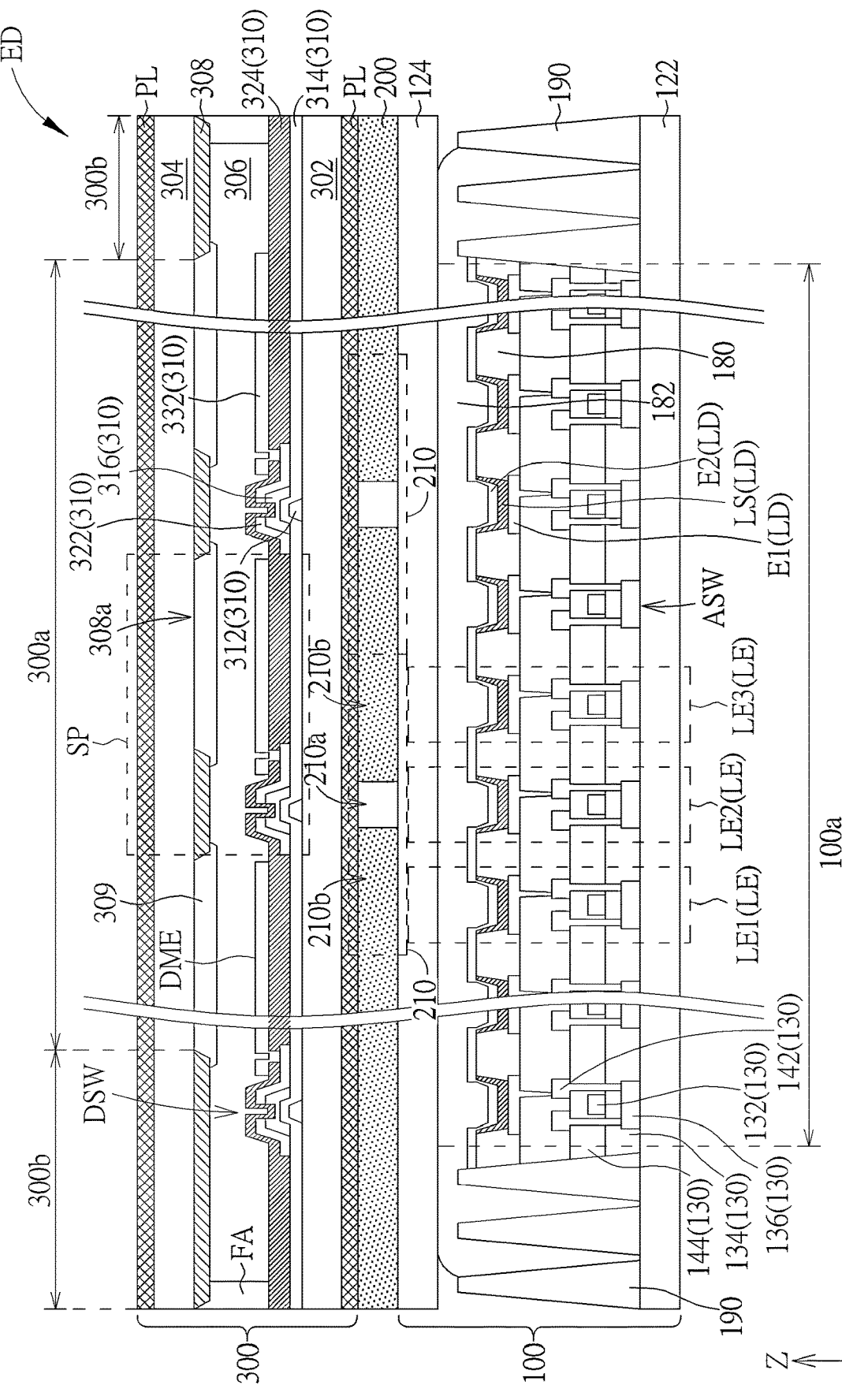
FIG. 5 is a schematic diagram showing a cross-sectional view of a display device according to a second embodiment of the present disclosure.
Figure 6:
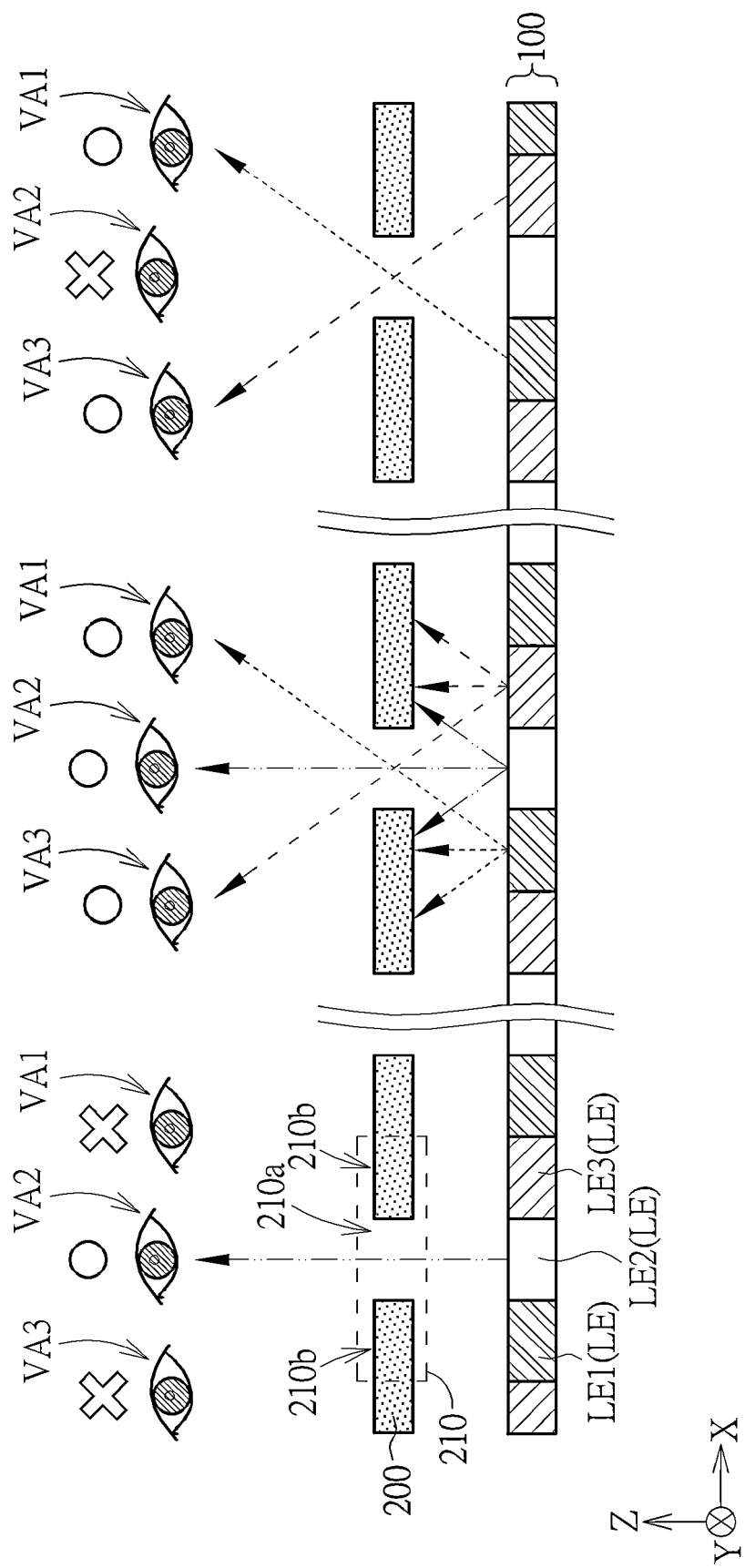
FIG. 6 is a schematic diagram showing a viewing-angle control of the display device according to the second embodiment of the present disclosure.

Referring to FIG. 5 and FIG. 6, FIG. 5 is a schematic diagram showing a cross-sectional view of a display device according to a second embodiment of the present disclosure, and FIG. 6 is a schematic diagram showing a viewing-angle control of the display device according to the second embodiment of the present disclosure, wherein in order to make the figure simple and clear, FIG. 6 omits the display layer 300 and simplifies the structure of the light emitting layer 100, the middle region of FIG. 6 shows that each light emitting unit LE and its corresponding three lights as an example, and the left-side and right side regions of FIG. 6 shows that each light emitting unit LE and its corresponding one light as an example (actually, the light emitting unit LE may emit the lights with various directions). As shown in FIG. 5, the difference between this embodiment and the first embodiment is that the light emitting layer 100 of this embodiment is self-luminous type. In this embodiment, the light emitting layer 100 includes a first light adjusting substrate 122, a light adjusting circuit layer 130, a light emitting element LD and a second light adjusting substrate 124 stacked in sequence along the direction Z, wherein the light emitting element LD includes a first electrode E1, a light emitting part LS and a second electrode E2 stacked in sequence along the direction Z, but not limited thereto. The light emitting part LS is electrically connected between the first electrode E1 and the second electrode E2, and is configured to emit light. The first electrode E1 is electrically connected to the drain of the light adjusting switching component ASW of the light adjusting circuit layer 130. In FIG. 5 and FIG. 6, because the light emitting element LD of this embodiment emits the light upward, the second electrode E2 may include the transparent conductive material. The light emitting layer 100 may further include a barrier layer 180 and an encapsulated layer 182. The barrier layer 180 is disposed between two of the light emitting elements LD, and the encapsulated layer 182 is disposed between the light emitting elements LD and the second light adjusting substrate 124. A blocking wall 190 is disposed at the periphery of the light emitting layer 100 to limit the range of the encapsulated layer 182 in the direction X and the direction Y, but not limited thereto. The blocking wall 190 may be formed of inorganic material, and the inorganic material may include silicon oxide, silicon nitride, silicon oxynitride, aluminum oxide, other suitable protecting material or combination thereof, but not limited thereto.

As shown in FIG. 5, the light emitting unit LE of the light emitting layer 100 may include at least one light emitting element LD and a corresponding light adjusting switching component ASW, but not limited thereto. Note that, the display device ED of this embodiment may control the intensity of the backlight emitted by each light emitting element LD by adjusting a voltage difference between the gate and the source of each light adjusting switching component ASW. For example, based on requirement (s), each light emitting element LD may emit the backlight (hereafter, it can be referred as "the light emitting unit LE is turned on") or not emit the backlight (hereafter, it can be referred as "the light emitting unit LE is turned off") individually, but not limited thereto. In addition, the light emitting element LD of this embodiment may include an LED, a micro-LED, a mini-LED, an OLED, a QLED or other suitable light source. Moreover, in FIG. 5, the stacked sequence of the layers in the light adjusting circuit layer 130 is different from the first embodiment. In this embodiment, the first semiconductor layer 136, the first insulating layer 134, the first conductive layer 132, the second insulating layer 144 and the second conductive layer 142 are stacked in sequence along the direction Z, such that the light adjusting switching component ASW is formed to be a top gate transistor.

On the other hand, another difference between this embodiment and the first embodiment is that the light adjusting structure 210 of this embodiment may include a plurality of shielding parts. The light adjusting structure 210 of this embodiment includes two shielding parts 210b and an opening part 210a situated between the two shielding parts 210b, but not limited thereto. In detail, the material of the light adjusting layer 200 may include light-shielding material, wherein the light transmittance of the light-shielding material may be less than 50%, but not limited thereto. For instance, the light-shielding material may include black resin, metal, metal oxide, photoresist, ink or any material having a function of absorbing and/or blocking the light. Each of the light adjusting structures 210 corresponds to at least three of the light emitting units LE of the light emitting layer 100. In FIG. 5 and FIG. 6, the opening part 210a corresponds to the second light emitting unit LE2, and the shielding parts 210b corresponds to the first light emitting unit LE1 and the third light emitting unit LE3, but not limited thereto. The light adjusting structure 210 of this embodiment may be disposed between the light emitting layer 100 and the display layer 300, such as be disposed on second light adjusting substrate 124, but not limited thereto. The shielding part 210b and the opening part 210a of the light adjusting structure 210 may be a strip extending along the direction Y, but not limited thereto. In other embodiment, the shielding parts 210b and the opening parts 210a may be arranged in the direction X and the direction Y alternately to be a grid type.

As shown in FIG. 6, the light adjusting structure 210 of the light adjusting layer 200 of this embodiment is configured to select the light-progressing direction (s) of the backlight (s) generated by the light emitting units LE. For example, in the three light emitting units LE corresponding to the light adjusting structure 210 shown in the middle of FIG. 6, regarding the backlight emitted by the first light emitting unit LE1, only the backlight progressing in a front right direction may pass through the opening part 210a of the light adjusting structure 210, and therefore the light adjusting structure 210 may select the backlight emitted by the first light emitting unit LE1 and progressing in the front right direction, such that the first light emitting unit LE1 may provide the backlight for the user to view from the first viewing-angle VA1; regarding the backlight emitted by the second light emitting unit LE2, only the backlight progressing in a front direction may pass through the opening part 210a of the light adjusting structure 210, and therefore the light adjusting structure 210 may select the backlight emitted by the second light emitting unit LE2 and progressing in the front direction, such that the second light emitting unit LE2 may provide the backlight for the user to view from the second viewing-angle VA2; regarding the backlight emitted by the third light emitting unit LE3, only the backlight progressing in a front left direction may pass through the opening part 210a of the light adjusting structure 210, and therefore the light adjusting structure 210 may select the backlight emitted by the third light emitting unit LE3 and progressing in the front left direction, such that the third light emitting unit LE3 may provide the backlight for the user to view from the third viewing-angle VA3, but not limited thereto.

Similarly, in the three light emitting units LE corresponding to the light adjusting structure 210 shown in the left side of FIG. 6, since only the second light emitting unit LE2 is turned on, the user may only view from the second viewing-angle VA2, and not view from the first viewing-angle VA1 and the third viewing-angle VA3. Similarly, in the three light emitting units LE corresponding to the light adjusting structure 210 shown in the right side of FIG. 6, since the first light emitting unit LE1 and the third light emitting unit LE3 are turned on, the user may view from the first viewing-angle VA1 and the third viewing-angle VA3, and not view from the second viewing-angle VA2.

Figure 7:
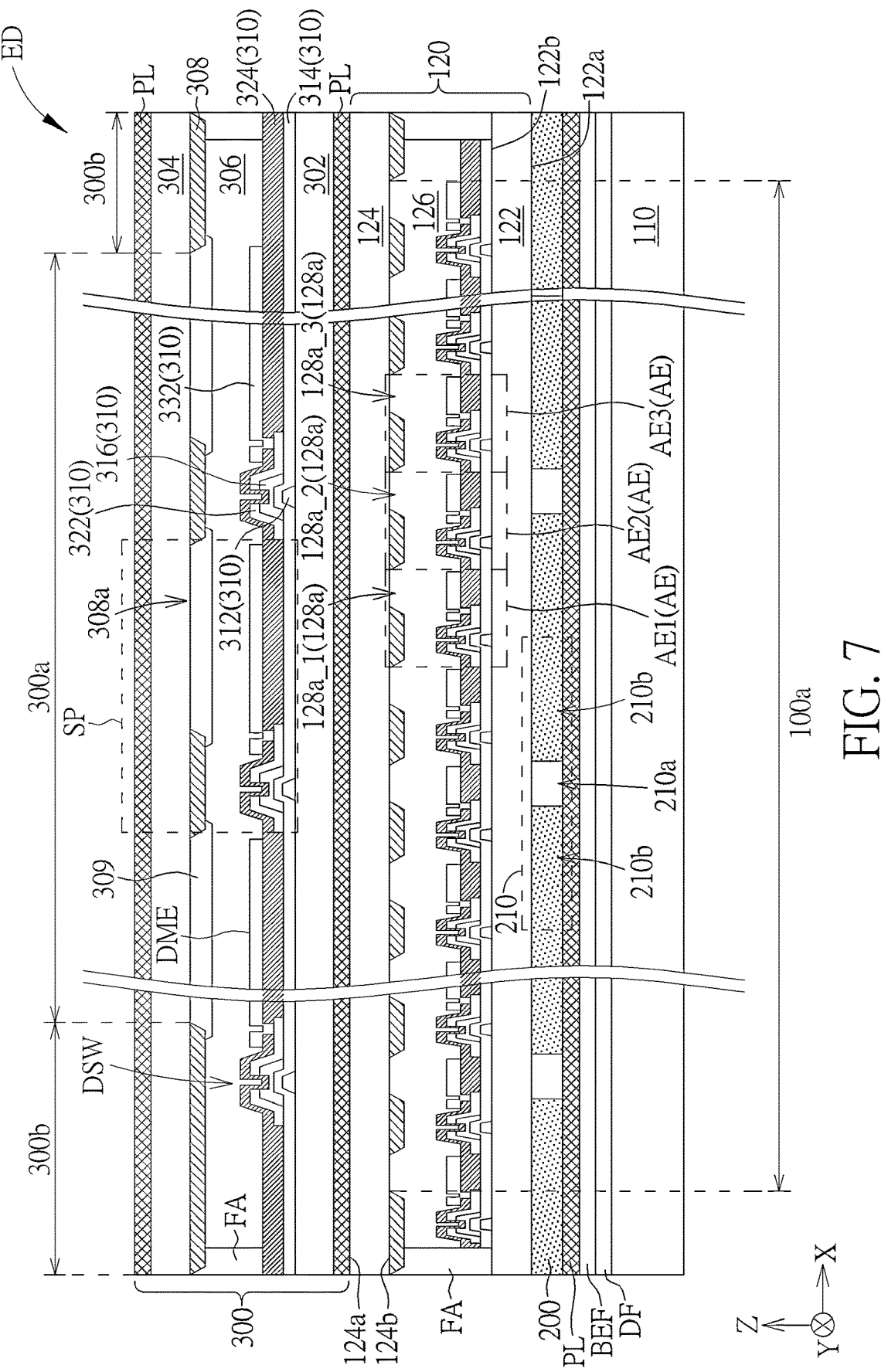
FIG. 7 is a schematic diagram showing a cross-sectional view of a display device according to a third embodiment of the present disclosure.
Figure 8:
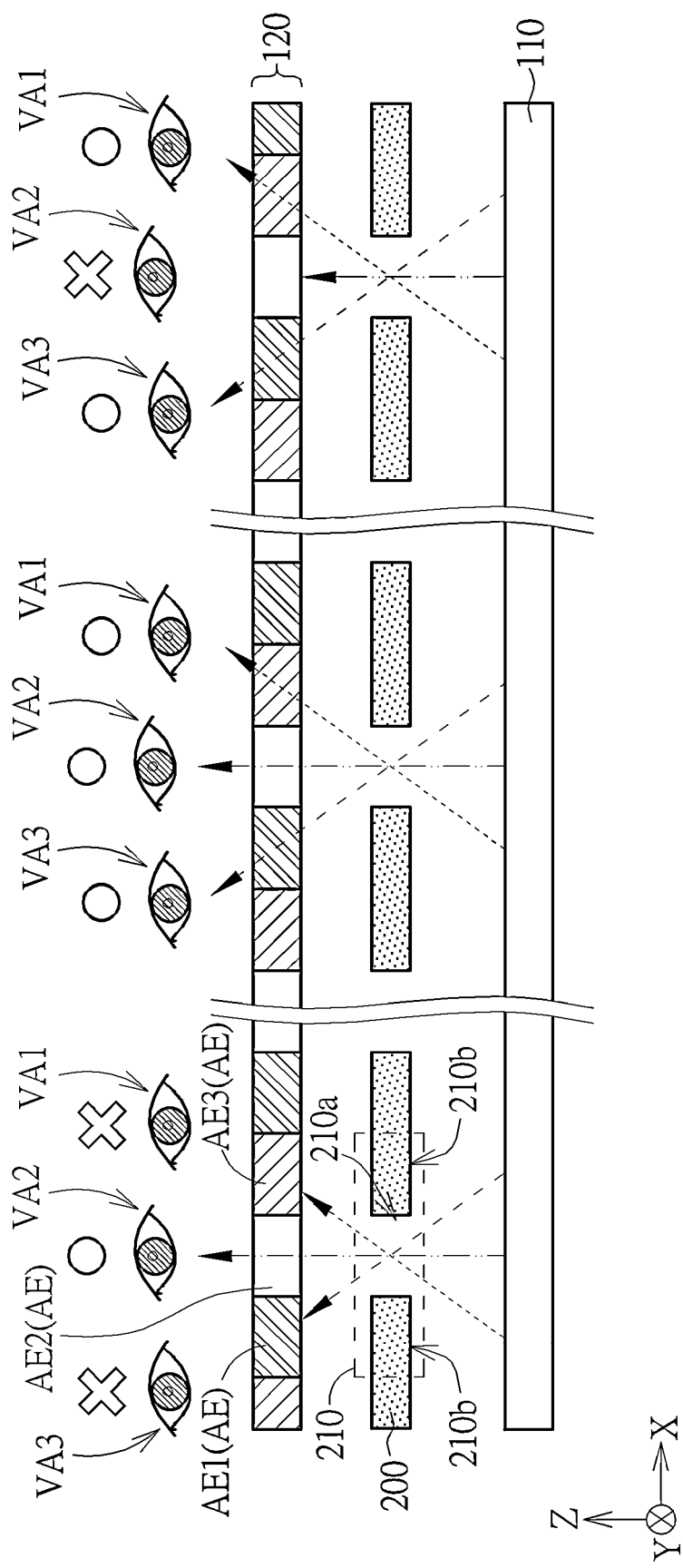
FIG. 8 is a schematic diagram showing a viewing-angle control of the display device according to the third embodiment of the present disclosure.

Referring to FIG. 7 and FIG. 8, FIG. 7 is a schematic diagram showing a cross-sectional view of a display device according to a third embodiment of the present disclosure, and FIG. 8 is a schematic diagram showing a viewing-angle control of the display device according to the third embodiment of the present disclosure, wherein in order to make the figures simple and clear, FIG. 8 omits the display layer 300 and simplifies the structure of the light adjusting panel 120, and FIG. 8 shows that each light switching structure AE is irradiated by one light generated by the backlight source 110 for example (actually, the backlight source 110 may emit the lights with various directions, and each light switching structure AE may be irradiated by the lights with more directions). In order to describe in the following briefly, three light switching structures AE corresponding to the same light adjusting structure 210 are referred as a first light switching structure AE1 (having a first opening unit 128a_1), a second light switching structure AE2 (having a second opening unit 128a_2) and a third light switching structure AE3 (having a third opening unit 128a_3) respectively. In FIG. 7, FIG. 8, FIG. 9 and FIG. 11, the first light switching structure AE1, the second light switching structure AE2 and the third light switching structure AE3 are arranged from left to right in sequence.

As shown in FIG. 7, the content of the light adjusting structure 210 of this embodiment may be referred to in the second embodiment, and this will not be redundantly described. The light adjusting layer 200 and the light adjusting panel 120 are disposed on the backlight source 110, and the light adjusting layer 200 of this embodiment is disposed between the light adjusting panel 120 and the backlight source 110. For example, the first light adjusting substrate 122 has a first surface 122a away from the display layer 300 and a second surface 122b close to the display layer 300, and the light adjusting layer 200 may be disposed on the first surface 122a of the first light adjusting substrate 122 (i.e., the light adjusting layer 200 is disposed between the first surface 122a of the first light adjusting substrate 122 and the polarizer PL) or may be disposed on the second surface 122b of the first light adjusting substrate 122, but not limited thereto. In other embodiments, the light adjusting layer 200 may be disposed between the backlight source 110 and the optical layer (e.g., the diffuser DF). In another embodiment, the light adjusting layer 200 may be disposed between the second light adjusting substrate 124 and the display layer 300 (e.g., the light adjusting layer 200 is disposed between the polarizer PL and a surface 124a of the second light adjusting substrate 124 close to the display layer 300).

As shown in FIG. 7 and FIG. 8, the light adjusting structure 210 of the light adjusting layer 200 of this embodiment is configured to select the light-progressing direction (s) of the initial backlight (s) generated by the backlight source 110. Then, the light switching structure AE of the light adjusting panel 120 controls whether the backlight with the selected light-progressing direction passes through or not. For instance, in this embodiment, the light adjusting structure 210 may select the initial backlight progressing in the front left direction, the initial backlight progressing in the front direction and the initial backlight progressing in the front right direction, the first light switching structure AE1 may control whether the initial backlight progressing in the front left direction passes through the light adjusting panel 120 or not, the second light switching structure AE2 may control whether the initial backlight progressing in the front direction passes through the light adjusting panel 120 or not, and the third light switching structure AE3 may control whether the initial backlight progressing in the front right direction passes through the light adjusting panel 120 or not, so as to achieve the function of controlling the backlight direction by regions. In the middle of FIG. 8, since the first light switching structure AE1, the second light switching structure AE2 and the third light switching structure AE3 are turned on, the user may view from the first viewing-angle VA1, the second viewing-angle VA2 and the third viewing-angle VA3. Similarly, in the left side of FIG. 8, since the second light switching structure AE2 is turned on only, the user may view from the second viewing-angle VA2 only, and not view from the first viewing-angle VA1 and the third viewing-angle VA3. Similarly, in the right side of FIG. 8, since the first light switching structure AE1 and the third light switching structure AE3 are turned on, the user may view from the first viewing-angle VA1 and the third viewing-angle VA3, and not view from the second viewing-angle VA2.

Figure 9:
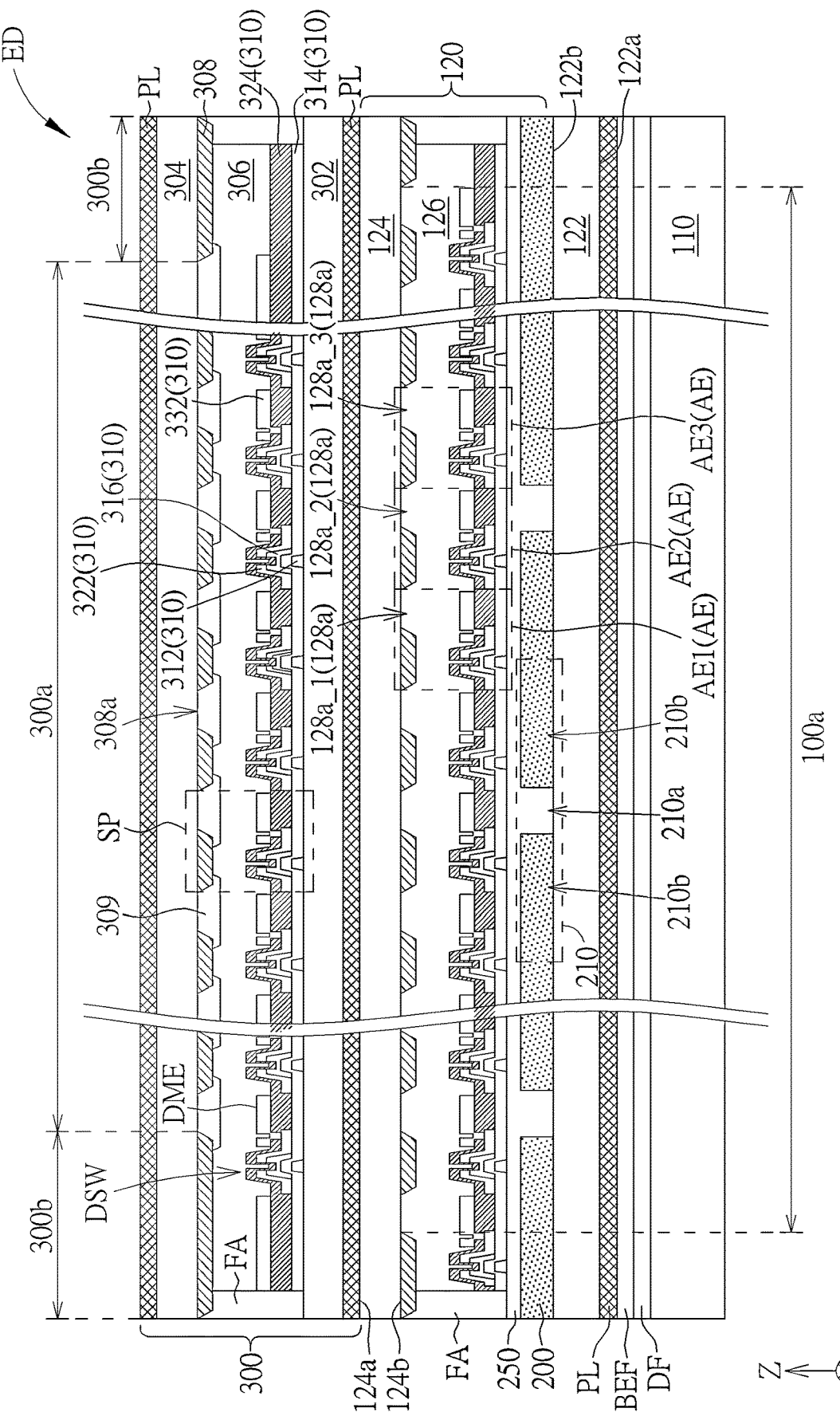
FIG. 9 is a schematic diagram showing a cross-sectional view of a display device according to a fourth embodiment of the present disclosure.

Referring to FIG. 9, FIG. 9 is a schematic diagram showing a cross-sectional view of a display device according to a fourth embodiment of the present disclosure. As shown in FIG. 9, the difference between this embodiment and the third embodiment is that the light adjusting layer 200 of this embodiment is disposed in the light adjusting panel 120. For example, the light adjusting layer 200 of this embodiment is disposed on the second surface 122b of the first light adjusting substrate 122 (e.g., the light adjusting layer 200 is disposed between the second surface 122b of the first light adjusting substrate 122 and a buffer layer 250), but not limited thereto. The buffer layer 250 may include transparent material such as organic material or glass, but not limited thereto. The organic material may include epoxy resin, acrylic acid resin (such as polymethylmetacrylate, PMMA), benzocyclobutene (BCB), PI, polyester, polydimethylsiloxane (PDMS), other suitable protective material or a combination thereof, but not limited thereto. In other embodiments, the light adjusting layer 200 may be disposed on a surface 124b of the second light adjusting substrate 124 away from the display layer 300, such as may be disposed between the light adjusting shielding layer 128 and the second light adjusting substrate 124. Moreover, in this embodiment, the size (e.g., the width) of the opening unit 128a of the light adjusting shielding layer 128 may be the same as the size (e.g., the width) of the sub-pixel opening 308a of the display shielding layer 308, but not limited thereto.

Figure 10:
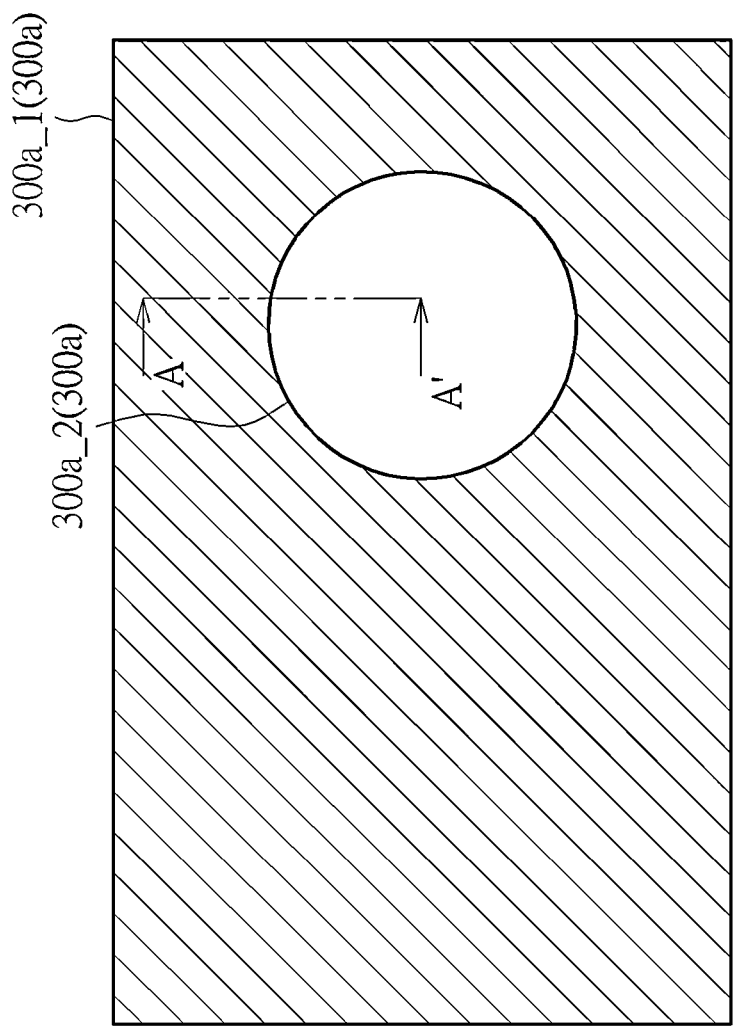
FIG. 10 is a schematic diagram showing a display region according to a fifth embodiment of the present disclosure.
Figure 11:
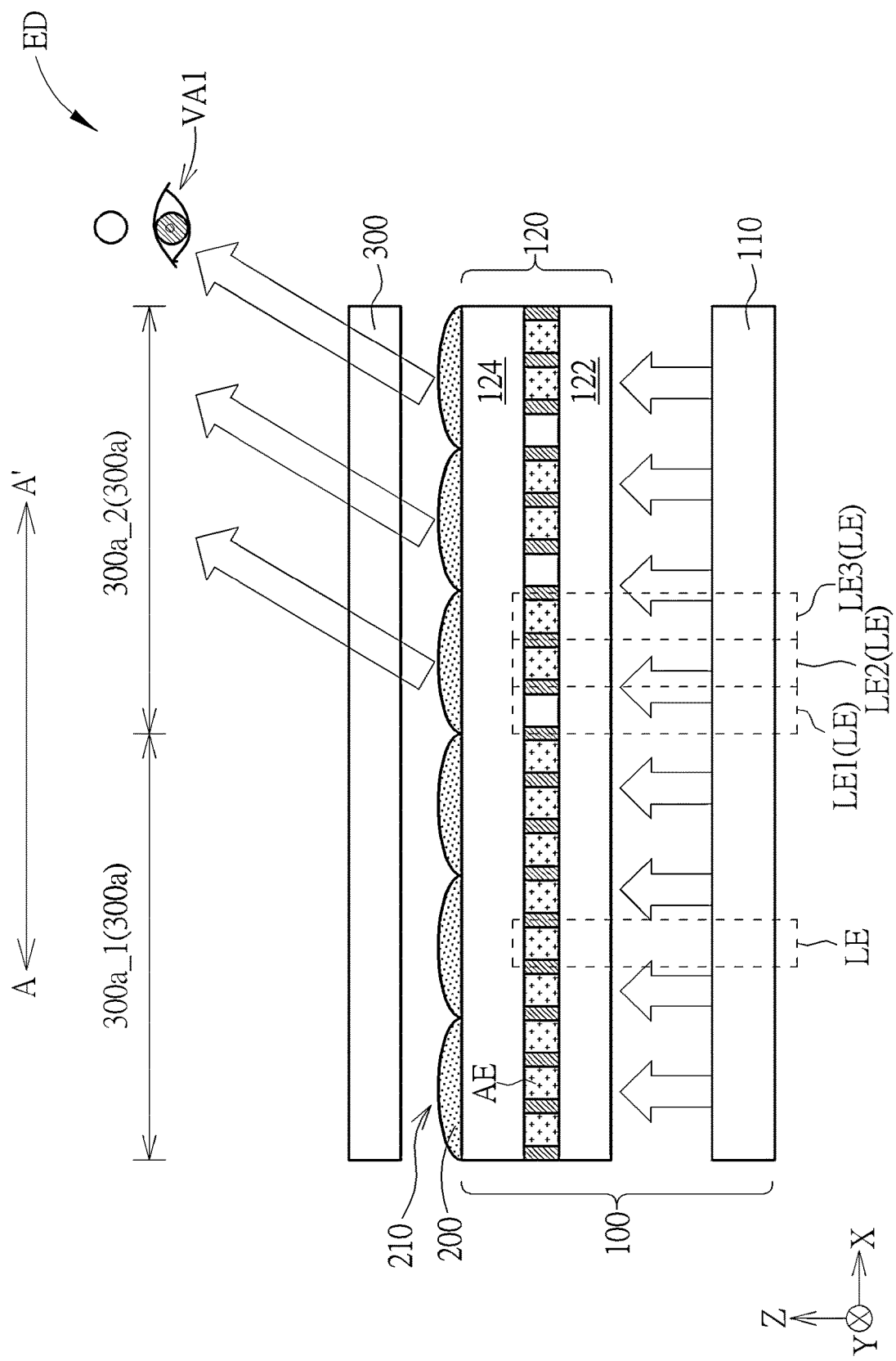
FIG. 11 is a schematic diagram showing a cross-sectional view of a display device according to the fifth embodiment of the present disclosure.

Referring to FIG. 10 and FIG. 11, FIG. 10 is a schematic diagram showing a display region according to a fifth embodiment of the present disclosure, and FIG. 11 is a schematic diagram showing a cross-sectional view of a display device according to the fifth embodiment of the present disclosure, wherein in order to make the figures simple and clear, FIG. 11 simplifies the structures of the display layer 300 and the light adjusting panel 120, the light switching structures AE marked with a shading (a "+" type shading) in FIG. 11 are turned off, and the light of the backlight source 110 in FIG. 11 is only shown the light parallel to the direction Z as an example (actually, the backlight source 110 may emit the lights with various directions). As shown in FIG. 10 and FIG. 11, the difference between this embodiment and the first embodiment is that the display region 300a of the display layer 300 of this embodiment may be divided into a plurality of display sub-regions. In this embodiment, the display region 300a may include a first display sub-region 300a_1 and a second display sub-region 300a_2, wherein the first display sub-region 300a_1 surrounds the second display sub-region 300a_2, but not limited thereto. The switching status of the light emitting units LE in different display sub-regions may be different, so as to cause different display situations. For example, in FIG. 11 corresponding the cross section line A-A' of FIG. 10, all of the light emitting units LE in the first display sub-region 300a_1 may be turned off, such that the first display sub-region 300a_1 displays an entire black image; in the second display sub-region 300a_2, the first light emitting unit LE1 corresponding to the light adjusting structure 210 may be turned on, and the second light emitting unit LE2 and the third light emitting unit LE3 corresponding to the light adjusting structure 210 may be turned off, such that the user may view the image displayed in the second display sub-region 300a_2 from the first viewing-angle VA1 only, so as to achieve a partial privacy screen function. In another case, all of the light emitting units LE in the first display sub-region 300a_1 may be turned on, such that the user may view the image displayed in the first display sub-region 300a_1 from the first viewing-angle VA1, the second viewing-angle VA2 and the third viewing-angle VA3; in the second display sub-region 300a_2, the first light emitting unit LE1 corresponding to the light adjusting structure 210 may be turned on, and the second light emitting unit LE2 and the third light emitting unit LE3 corresponding to the light adjusting structure 210 may be turned off, such that the user may view the image displayed in the second display sub-region 300a_2 from the first viewing-angle VA1 only, so as to achieve the partial privacy screen function. The operating method and display method are not limited by the above.

In summary, the display device of the present disclosure has the light adjusting layer. Thus, the light-progressing direction of the backlight may be controlled by controlling the switching status of each light emitting unit and/or the switching status of each light switching structure, so as to achieve the privacy screen function. Furthermore, under the condition that the display device of the present disclosure performs the privacy screen function, in addition to no change in the resolution of the display layer, the display device may also use the user tracking function.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
  a light source;
  at least three switching components disposed on the light source; and
  a light adjusting layer overlapped with the at least three switching components, wherein the light adjusting layer comprises at least one light adjusting structure, each of the at least one light adjusting structure is one lens structure, and one of the at least one light adjusting structure is corresponding to the at least three switching components and configured to adjust a light progressing direction of a light generated by the light source;
  wherein the electronic device provides a first viewing-angle in a first state, the electronic device provides a second viewing-angle in a second state, and the first viewing-angle is different from the second viewing-angle.

2. The electronic device according to claim 1, wherein the at least one light adjusting structure comprises a plurality of light adjusting structures, and the plurality of light adjusting structures are a plurality of repeated units.

3. The electronic device according to claim 1, wherein the at least one light adjusting structure comprises a plurality of light adjusting structures, and a recess is formed at a connection between adjacent two of the plurality of light adjusting structures.

4. The electronic device according to claim 3, wherein the recess has a first thickness, one of the plurality of light adjusting structures has a second thickness, the second thickness is a maximum thickness of the plurality of light adjusting structures, and the first thickness is less than the second thickness.

5. The electronic device according to claim 1, further comprising a medium layer overlapped with the at least one light adjusting structure.

6. The electronic device according to claim 5, wherein the medium layer comprises liquid crystal.

7. The electronic device according to claim 5, wherein the medium layer is configured to control an intensity of the light passing through the medium layer.

8. The electronic device according to claim 1, further comprising a display layer comprising the at least three switching components.

9. The electronic device according to claim 1, wherein each of the at least three switching components comprises a thin film transistor.

* * * * *